United States Patent
Deshpande et al.

(10) Patent No.: US 11,296,864 B2
(45) Date of Patent: Apr. 5, 2022

(54) IDENTIFYING FAULTS IN A BLOCKCHAIN ORDERING SERVICE

(71) Applicant: International Business Machines Corporation, Armonk, NY (US)

(72) Inventors: Pralhad Dinesh Deshpande, Singapore (SG); Proshanta Sarkar, Kolkata (IN); Santanu Mitra, Kolkata (IN); Sudip Dutta, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 15/981,471

(22) Filed: May 16, 2018

(65) Prior Publication Data

US 2019/0356470 A1 Nov. 21, 2019

(51) Int. Cl.
*H04L 29/06* (2006.01)
*H04L 9/06* (2006.01)
*H04L 9/32* (2006.01)
*G06Q 30/06* (2012.01)

(52) U.S. Cl.
CPC ....... *H04L 9/0637* (2013.01); *G06Q 30/0635* (2013.01); *H04L 9/3265* (2013.01)

(58) Field of Classification Search
CPC .. H04L 9/0637; H04L 9/3265; G06Q 30/0635
See application file for complete search history.

(56) References Cited

U.S. PATENT DOCUMENTS

| | | | |
|---|---|---|---|
| 7,797,457 B2 | 9/2010 | Lamport | |
| 8,464,091 B2 | 6/2013 | Butterworth | |
| 8,880,198 B2 | 11/2014 | Goose et al. | |
| 2017/0034197 A1 | 2/2017 | Daniel et al. | |
| 2017/0126702 A1* | 5/2017 | Krishnamurthy | ..... H04L 63/123 |
| 2017/0236120 A1 | 8/2017 | Herlihy et al. | |
| 2017/0236123 A1* | 8/2017 | Ali | ..... G06Q 20/3825 705/75 |
| 2017/0295023 A1 | 10/2017 | Madhavan et al. | |
| 2018/0052681 A1 | 2/2018 | Cabral et al. | |
| 2018/0082296 A1 | 3/2018 | Brashers | |
| 2018/0159682 A1 | 6/2018 | Futcher et al. | |
| 2018/0219669 A1 | 8/2018 | Chen et al. | |
| 2018/0219671 A1 | 8/2018 | Velissarios et al. | |
| 2018/0240107 A1* | 8/2018 | Andrade | ................ G06Q 20/36 |
| 2018/0253702 A1 | 9/2018 | Dowding | |
| 2018/0255090 A1 | 9/2018 | Kozloski et al. | |
| 2018/0294955 A1* | 10/2018 | Rhie | ................... G06F 16/2272 |

(Continued)

OTHER PUBLICATIONS

"Byzantine fault tolerance," Wikipedia, the free encyclopedia. Retrieved from Internet using: https://en.wikipedia.org/wiki/Byzantine_fault_tolerance.

(Continued)

*Primary Examiner* — Jeffrey C Pwu
*Assistant Examiner* — Rodman Alexander Mahmoudi

(57) ABSTRACT

An example operation may include one or more of signing a blockchain transaction by an endorsement peer member of a blockchain, transmitting the blockchain transaction to an ordering service, identifying a blockchain transaction queue length, and receiving a signed promise from the ordering service that the blockchain transaction will be included in an identified block number based on the blockchain transaction queue length.

15 Claims, 16 Drawing Sheets

(56) References Cited

U.S. PATENT DOCUMENTS

| | | | | |
|---|---|---|---|---|
| 2018/0308134 | A1* | 10/2018 | Manning | G06Q 30/02 |
| 2018/0336552 | A1* | 11/2018 | Bohli | H04L 9/3236 |
| 2018/0343120 | A1 | 11/2018 | Andrade | |
| 2019/0019180 | A1 | 1/2019 | Coburn et al. | |
| 2019/0036906 | A1* | 1/2019 | Biyani | H04L 9/3236 |
| 2019/0102409 | A1* | 4/2019 | Shi | G06F 16/1834 |
| 2019/0139043 | A1* | 5/2019 | Davis | G06F 16/2255 |
| 2019/0295078 | A1* | 9/2019 | Bae | H04L 9/0643 |
| 2019/0303621 | A1 | 10/2019 | Baset et al. | |

OTHER PUBLICATIONS

Androulaki et al., "Hyperledger fabric: A distributed operating system for permissioned blockchains," Proceedings of the 13th EuroSys Conference, ser. EuroSys '18, Apr. 2018, pp. 30:1-30:15.

Guisheng Fan, Huiqun Yu, Liqiong Chen, and Dongmei Liu, "Model Based Byzantine Fault Detection Technique for Cloud Computing," 2012 IEEE Asia-Pacific Services Computing Conference, Year: 2012, pp. 249-256.

International Search Report and Written Opinion issued in the corresponding International Application No. PCT/EP2019/059364 dated Jun. 14, 2019.

Wei-Tek Tsai, Xiaoying Bai, and Lian Yu, "Design Issues in Permissioned Blockchains for Trusted Computing," 2017 IEEE Symposium on Service-Oriented System Engineering (SOSE), Year: 2017, pp. 153-159.

Yongjian Wang, Zhongzhi Luan, Depei Qian, and Jian Dong, "Q-Detector: A Quorum-Based Byzantine Fault Detector," 2015 International Conference on Cloud Computing and Big Data (CCBD), Year: 2015, pp. 365-372.

List of IBM Patents or Patent Applications Treated as Related, May 16, 2018.

Pralhad Dinesh Deshpande, Identifying Faults in a Blockchain Ordering Service, U.S. Appl. No. 15/981,407, filed May 16, 2018 (a copy is not provided as this application is available to the Examiner).

* cited by examiner

IDENTIFYING FAULTS IN A BLOCKCHAIN ORDERING SERVICE

TECHNICAL FIELD

This application generally relates to processing blockchain transactions, and more particularly, to identifying faults in a blockchain ordering service.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in a blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to a blockchain ledger, all peers need to reach a consensus status.

Conventionally, a blockchain transactions with lower transaction fees may become stagnant while awaiting blockchain processing due to a lack of interest by blockchain miners. The miners are less likely to be interested in being rewarded less to perform a task which could be performed on a higher rewarded task. Miners may operate in a pool of potential candidates. The pool may be awarded a set of transactions to mine based on an award configuration of awarding transactions assigned to the pool. Sometimes, those miners in a particular pool have to wait a period of time before receiving the awarded transactions to mine.

SUMMARY

One example embodiment may provide a method that includes one or more of initiating a timer to begin timing an audit procedure, when the timer expires after a predefined period of time, randomly selecting a committer node member of a blockchain, transmitting a request for a hash of a blockchain block, comparing the hash of the blockchain block, received from the randomly selected committer node, to a known value of the hash of the blockchain block, and determining whether the hash of the blockchain block received matches the known value of the hash of the blockchain block.

Another example embodiment may include an apparatus that includes a processor configured to perform one or more of initiate a timer to begin timing an audit procedure, when the timer expires after a predefined period of time, randomly select a committer node member of a blockchain, and includes a transmitter configured to transmit a request for a hash of a blockchain block. The processor is further configured to compare the hash of the blockchain block, received from the randomly selected committer node, to a known value of the hash of the blockchain block, and determine whether the hash of the blockchain block received matches the known value of the hash of the blockchain block.

Yet another example embodiment may include a non-transitory computer readable storage medium configured to store instructions that when executed cause a processor to perform one or more of initiating a timer to begin timing an audit procedure, when the timer expires after a predefined period of time, randomly selecting a committer node member of a blockchain, transmitting a request for a hash of a blockchain block, comparing the hash of the blockchain block, received from the randomly selected committer node, to a known value of the hash of the blockchain block, and determining whether the hash of the blockchain block received matches the known value of the hash of the blockchain block.

Still another example embodiment may include a method that includes one or more of signing a blockchain transaction by an endorsement peer member of a blockchain, transmitting the blockchain transaction to an ordering service, identifying a blockchain transaction queue length, and receiving a signed promise from the ordering service that the blockchain transaction will be included in an identified block number based on the blockchain transaction queue length.

Still yet another example embodiment may include an apparatus that includes a processor configured to perform one or more of sign a blockchain transaction by an endorsement peer member of a blockchain, a transmitter configured to transmit the blockchain transaction to an ordering service, the processor is further configured to identify a blockchain transaction queue length, and a receiver configured to receive a signed promise from the ordering service that the blockchain transaction will be included in an identified block number based on the blockchain transaction queue length.

Still yet a further example embodiment may include a non-transitory computer readable storage medium configured to store instructions that when executed cause a processor to perform one or more of signing a blockchain transaction by an endorsement peer member of a blockchain, transmitting the blockchain transaction to an ordering service, identifying a blockchain transaction queue length, and receiving a signed promise from the ordering service that the blockchain transaction will be included in an identified block number based on the blockchain transaction queue length.

DETAILED DESCRIPTION

Figure 1A:
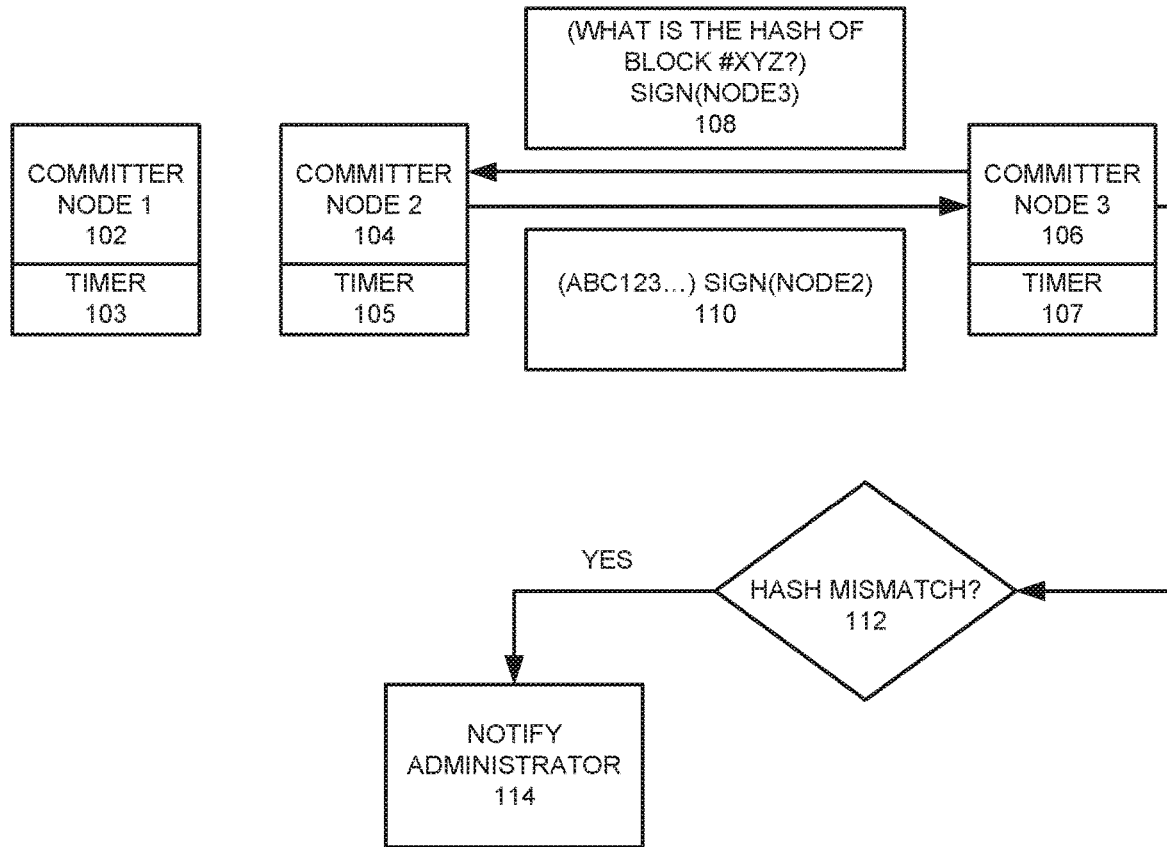
FIG. 1A illustrates a network configuration of blockchain transaction management, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which provide a way to detect Byzantine faults in a blockchain ordering service. Examples of Byzantine faults may include lying/falsifications about past transactions, such as in the event that a message was sent out of order and said to be in the correct order. The hash of a previous message being part of a current message is one approach to alleviating this type of fault. Another type of fault is the equivocation fault, such as when different hash chains are identified for different committer nodes. Still another type of fault is the denial of service type of fault where the ordering service can deny service to a submitting peer and can accept a message but not include that message in the blockchain. In this example, an ordering service may have multiple versions of an ordering history of transactions. The clients do not reject the blocks because the hash chain is maintained. One approach to avoiding such Byzantine faults may provide a protocol that permits a committer node to detect the ordering service's equivocation Byzantine behavior and proactively declare the behavior a fault.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The instant application in one embodiment relates to processing blockchain transactions and in another embodiment relates to using alternative incentivized reward approaches for accelerated processing of blockchain transactions.

FIG. 1A illustrates a network configuration of blockchain transaction management, according to example embodiments. Referring to FIG. 1A, in this fault detection configuration 100, the committer nodes 102, 104 and 106 each have their own timers 103, 105 and 107, respectively, which are used to track a period of time where the expiration provides an opportunity to audit the blockchain transactions. For instance, in one example, the committer node 3-106 may have a timer 107 expire and then submit an audit of a hash of a particular block 108 to another committer node, such as node 104. The questioned committer node 104 may respond with an answer 110 to a question 108, such as "What is the hash of block #XYZ?". The selection of the committer node to answer the hash audit request may be a random selection from any of the available committer nodes of the ordering service. In the event that the hash provided is not a match 112 then the event will be declared a fault and the administrator is notified 114 of the fault event with the blockchain transaction ordering service.

Figure 1B:
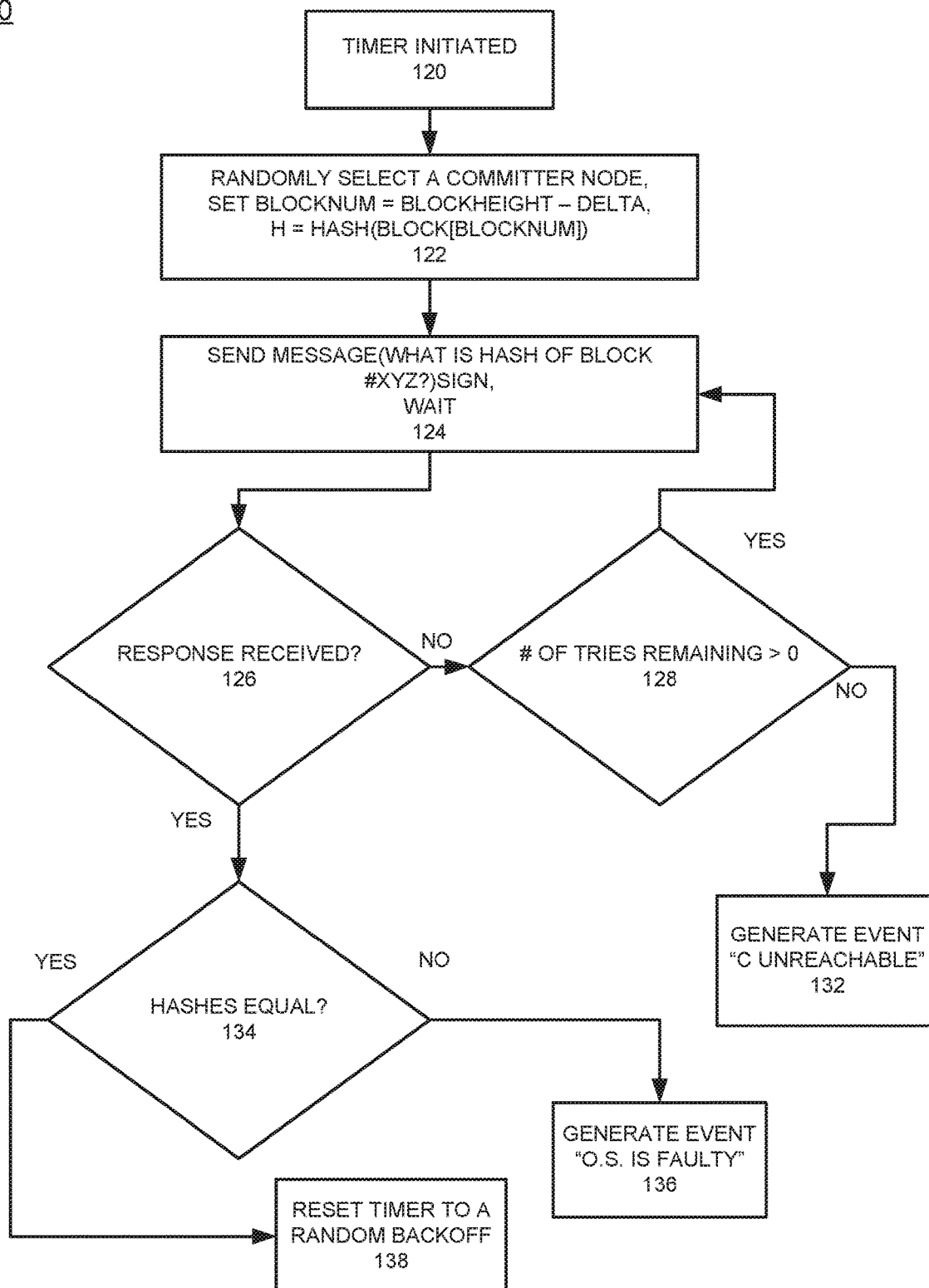
FIG. 1B illustrates a flow diagram of blockchain transaction management, according to example embodiments.

FIG. 1B illustrates a flow diagram of blockchain transaction management, according to example embodiments. Referring to FIG. 1B, the flow diagram 150 includes an example where one committer node audits another committer node. The process begins with a timer associated with one committer node being initiated or expiring 120. Next, a committer node is randomly selected, and a block number is set to a 'blockheight' minus a 'delta' value. The hash value 'H' is set to the hash of the block number selected 122. The message request that is sent may ask for the hash of the block number identified, and the message is signed 124. The response to the request is received 126 or not received, in which case the request is resubmitted a certain number of times 128 prior to declaring the process unreachable 132, such as in the case when the committer node is non-responsive. In the event that the response is received, the hash received is compared to the hash that is known and the determination is made as to whether those hashes are equal values 134. If not, the event is declared a fault 136, if so, the even is declared a non-fault and the timer is reset 138.

In the approach of selecting a committer node to provide a hash, a request is sent for a hash of a recent block. This is the block identified by BlockNum=blockHeight−delta. A hash is a unique fingerprint of the data contained in the block. This process requests that 'fingerprint' and compares it with a fingerprint of a block with a same block number to check if both committer nodes have the exact same block. Different block committers could be on different forks of the blockchain. Only after a certain number (i.e., delta number) of blocks are mined on top of a certain block, then assurance with a high probability can be confirmed that this block will now permanently be part of the blockchain. In one blockchain example, a party may wait for six blocks to be mined on top of the block in which a transaction has been included to consider it a 'certainty' that the block is now committed and will not be reversed.

Figure 1C:
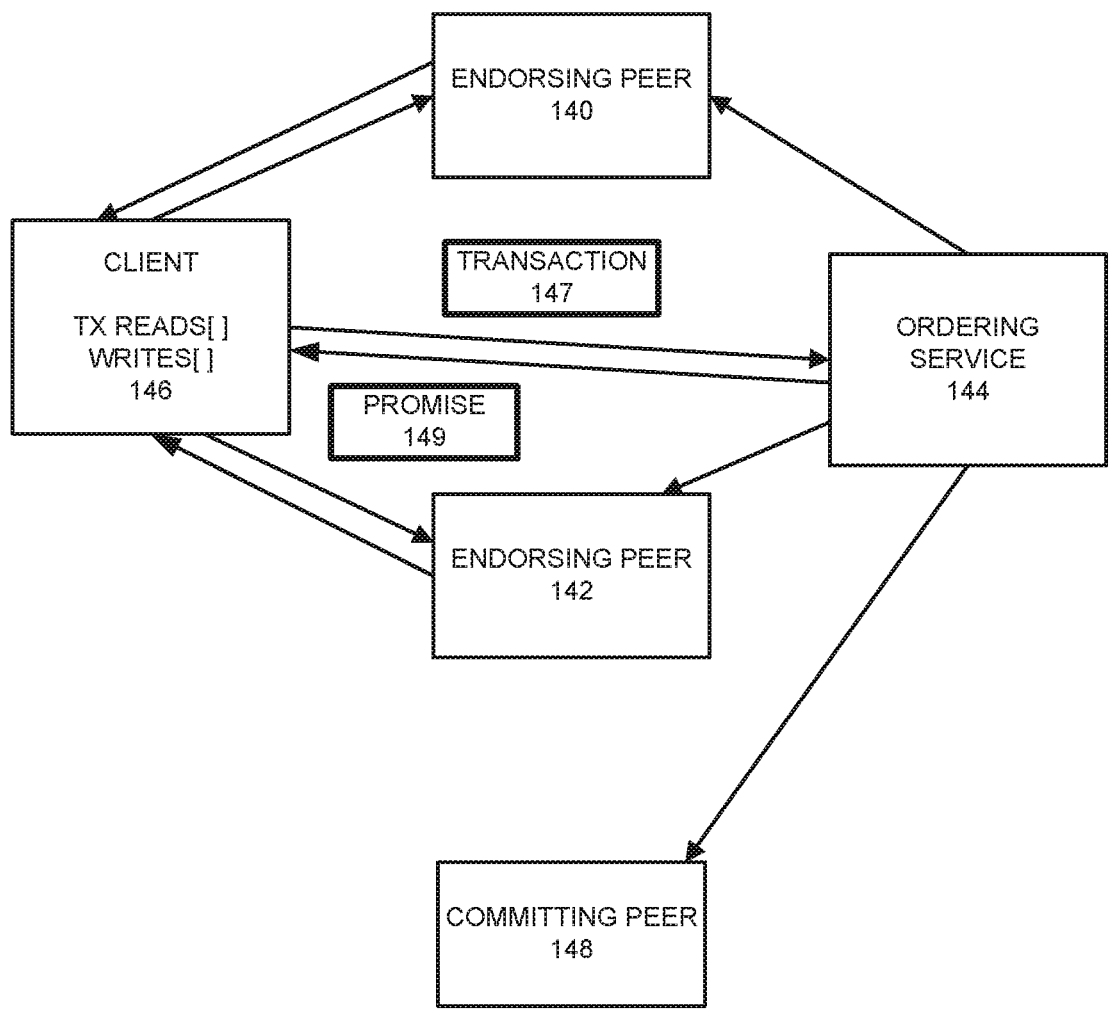
FIG. 1C illustrates a network configuration of blockchain transaction management at an ordering service, according to example embodiments.

FIG. 1C illustrates a network configuration of blockchain transaction management at an ordering service, according to example embodiments. Referring to FIG. 1C, the example demonstrates another example approach to identify faults. In this case, the submitting peer or client node may detect an ordering service's denial of service and declare it faulty if necessary. The approach 170 provides that the client node 146 may submit a blockchain transaction to one or more endorsing peers 140/142, which sign the transaction and submits the transaction 147 to the ordering service 144. The ordering service may then make a promise and signs the promise 149 to include the transaction in a specific block number. The promise 149 is sent back to the client 146 and the transaction is sent to the endorsing peers again to be committed. The committing peer 148 will then commit the transaction if the promise is part of the transaction.

In one example, a client creates a transaction and the client collects endorsements from endorsing peers, which implies that the endorsing peers are accepting the way the transaction is composed and what effects it will have on the blockchain. The transaction with all the required endorsements is sent to the ordering service which responds with a promise message. The promise is logically identified to have the form: "I will include this transaction identified by "transaction ID" into the blockchain before a certain block number." Then, the transaction is set to a block based on a respective queue length.

In one example, the orderer may have 100 transactions that are yet to be included in a block. Here, in this case, the queue length is 100. Assuming each block can hold 20 transactions, just for example purposes, and a current 'blockHeight' is 'H'. The transaction will be added to a H+6th block. Subsequently, the client receives the transaction promise and then appends the promise to the transaction. For the attach promise to the transaction (TX), TX=TX·promise, which is performed by the ordering service. After this operation, the ordering service queues up the transaction and in a first-in-first-out order, sends the TX with the promise to all the endorsing and committing peers.

Figure 1D:
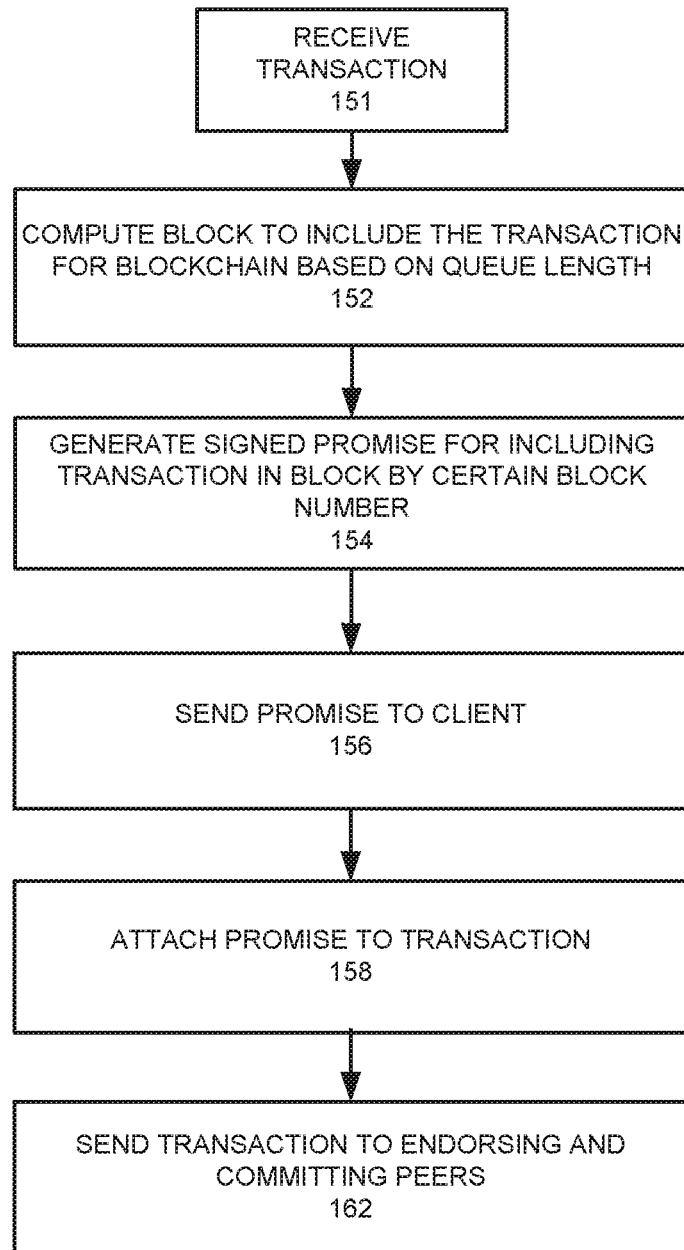
FIG. 1D illustrates a flow diagram of blockchain transaction management at an ordering service, according to example embodiments.

FIG. 1D illustrates a flow diagram of blockchain transaction management at an ordering service, according to example embodiments. In FIG. 1D, the flow diagram 180 provides that the transaction is received 151 and the block is computed to include a transaction for the blockchain based on the queue length 152. A signed promise is generated to include the transaction in a block by a certain block number 154. The promise is sent to the client 156 and is appended to the blockchain transaction 158. The transaction is sent to an endorsing and committing peer 162 to finalize and commit the transaction.

Figure 1E:
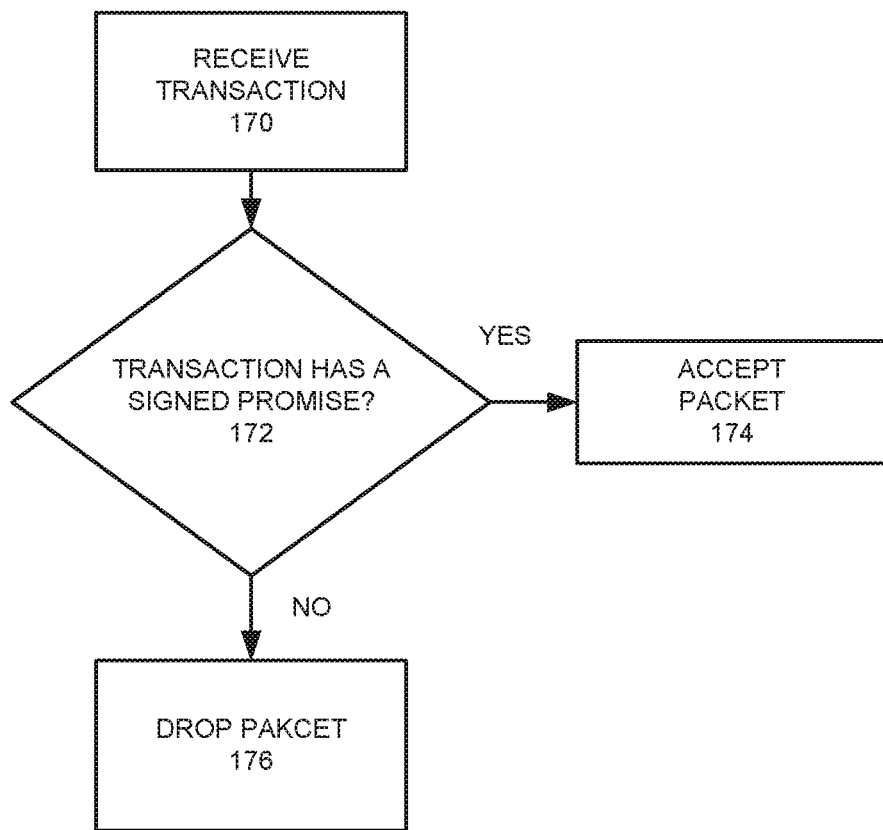
FIG. 1E illustrates a flow diagram of blockchain transaction management at an endorsing/committing peer node, according to example embodiments.

FIG. 1E illustrates a flow diagram of blockchain transaction management at an endorsing/committing peer node, according to example embodiments. Referring to FIG. 1E, the flow diagram 190 includes an example of the committing node's operation, the example provides that the transaction is received 170 and a determination is made as to whether the transaction is signed with a promise 172. If not, the packet is dropped 176. If so, the packet is accepted 174 and committed to the blockchain.

Figure 2A:
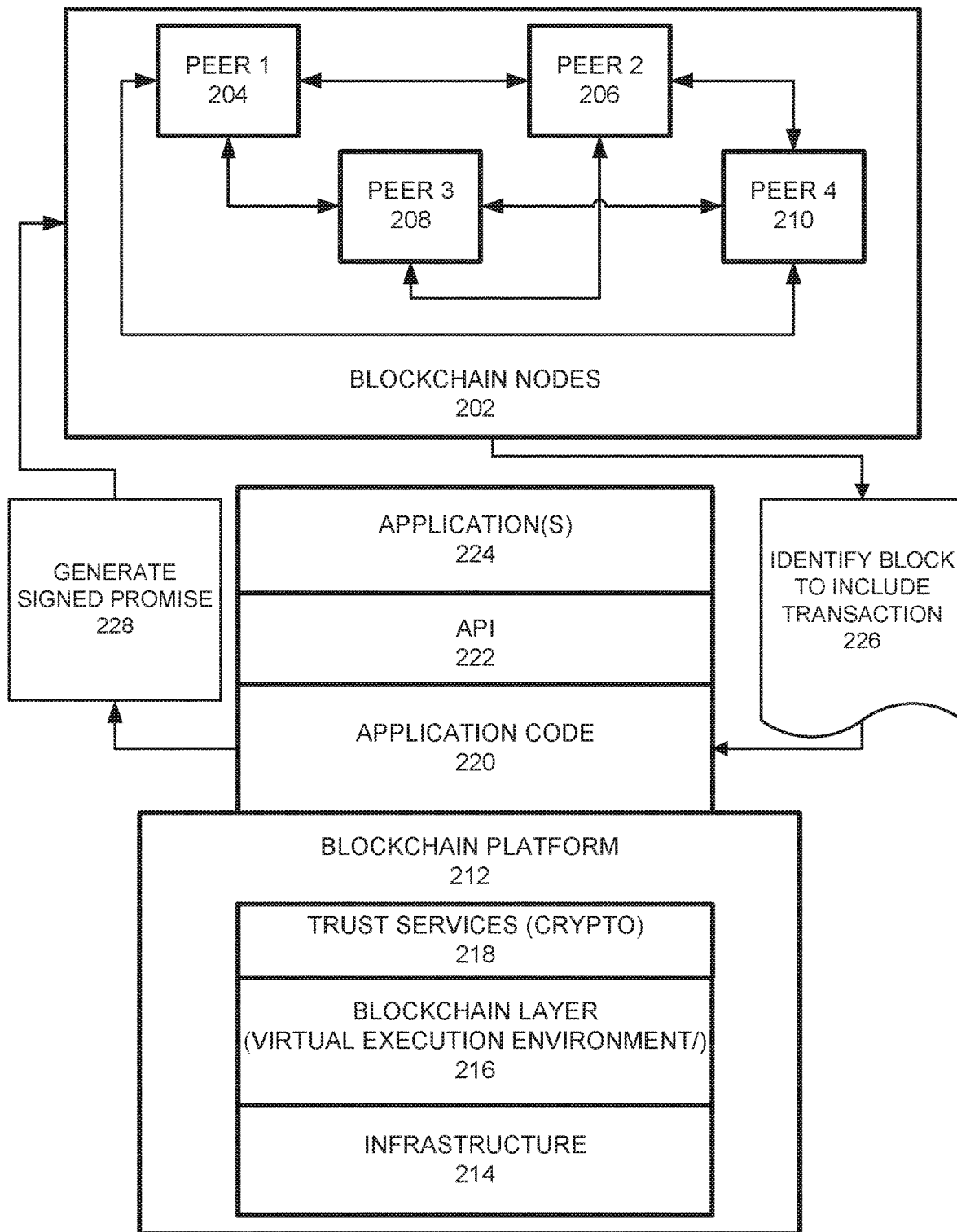
FIG. 2A illustrates an example peer node blockchain architecture configuration for blockchain transaction management, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, in one example, certain blockchain transactions which require commitment may be paired with a particular block 226. Once the transaction(s) is identified and paired to a block, a signed promise 228 may be generated to include with the transaction for verification purposes.

Figure 2B:
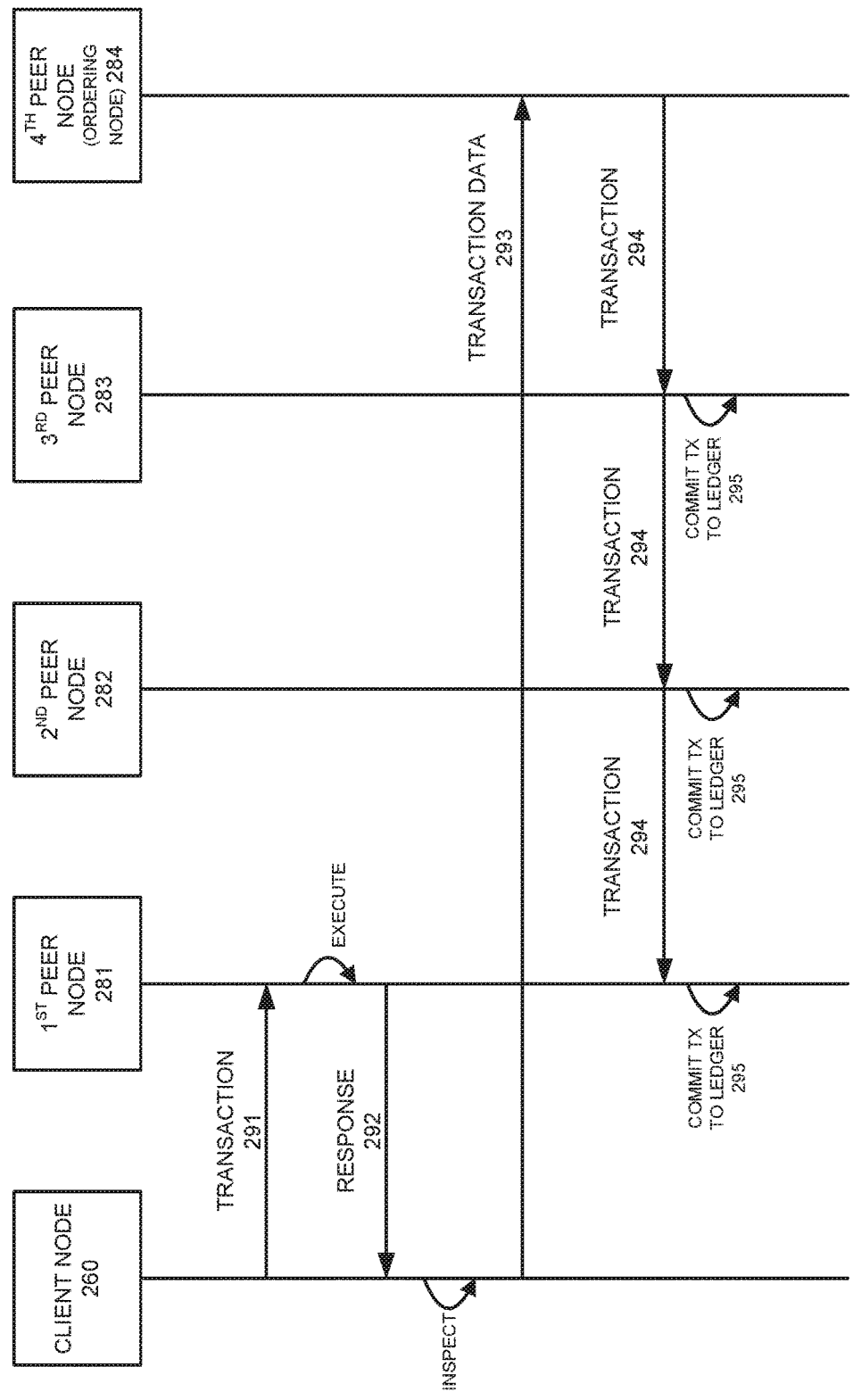
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
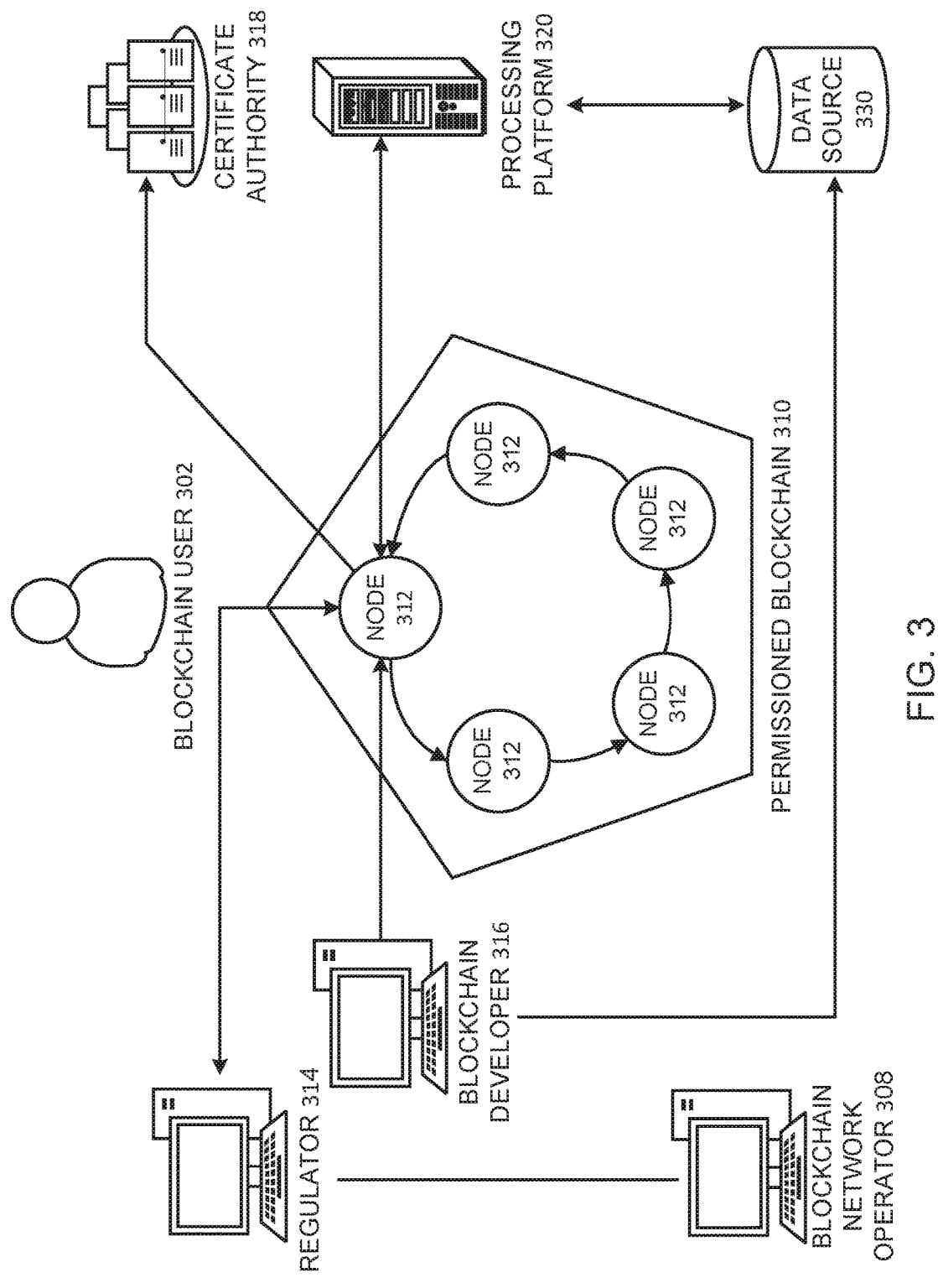
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
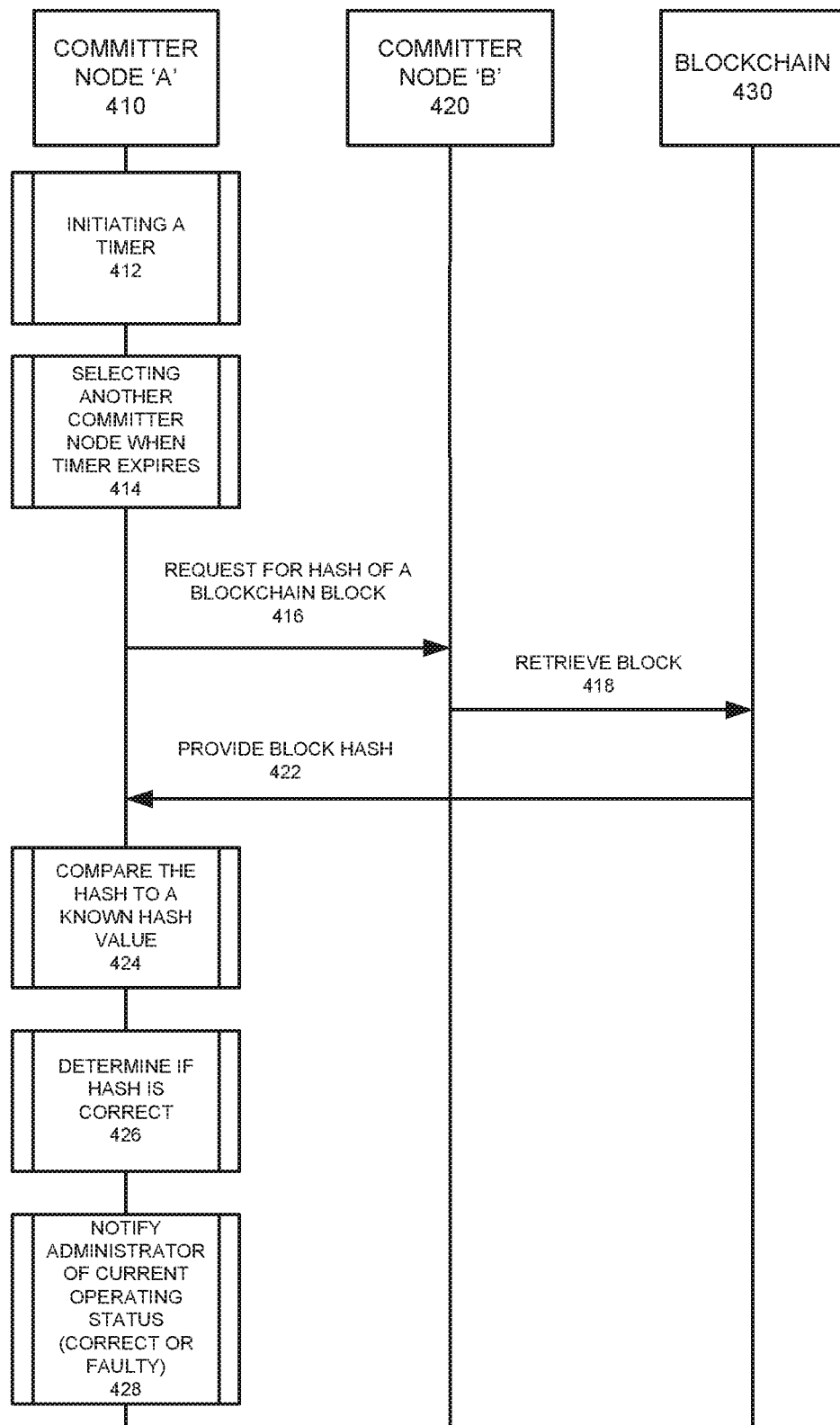
FIG. 4A illustrates a system messaging diagram for blockchain transaction management at a commitment node, according to example embodiments.

FIG. 4A illustrates a system messaging diagram for blockchain transaction management at a commitment node, according to example embodiments. Referring to FIG. 4A, in this example, the system 400 includes a committer node A 410, B 420 and a blockchain 430 as a reference for transaction information. The first committer node 410 may have a timer set 412 that is initiated, and which has a deadline or expiration time upon expiration of which the process for auditing another node 420 begins with a random selection procedure 414, which selects one of several available candidates. The request is sent to the obtain the hash of a certain block 416. The block may be recalled 418 from the blockchain and provided 422 to the committer node A 410. The procedure than requires the hash received by compared 424 to determine if that hashes are correct 426 and if not, the administrator is notified of an error 428. Or, may be notified of a non-error as well.

Figure 4B:
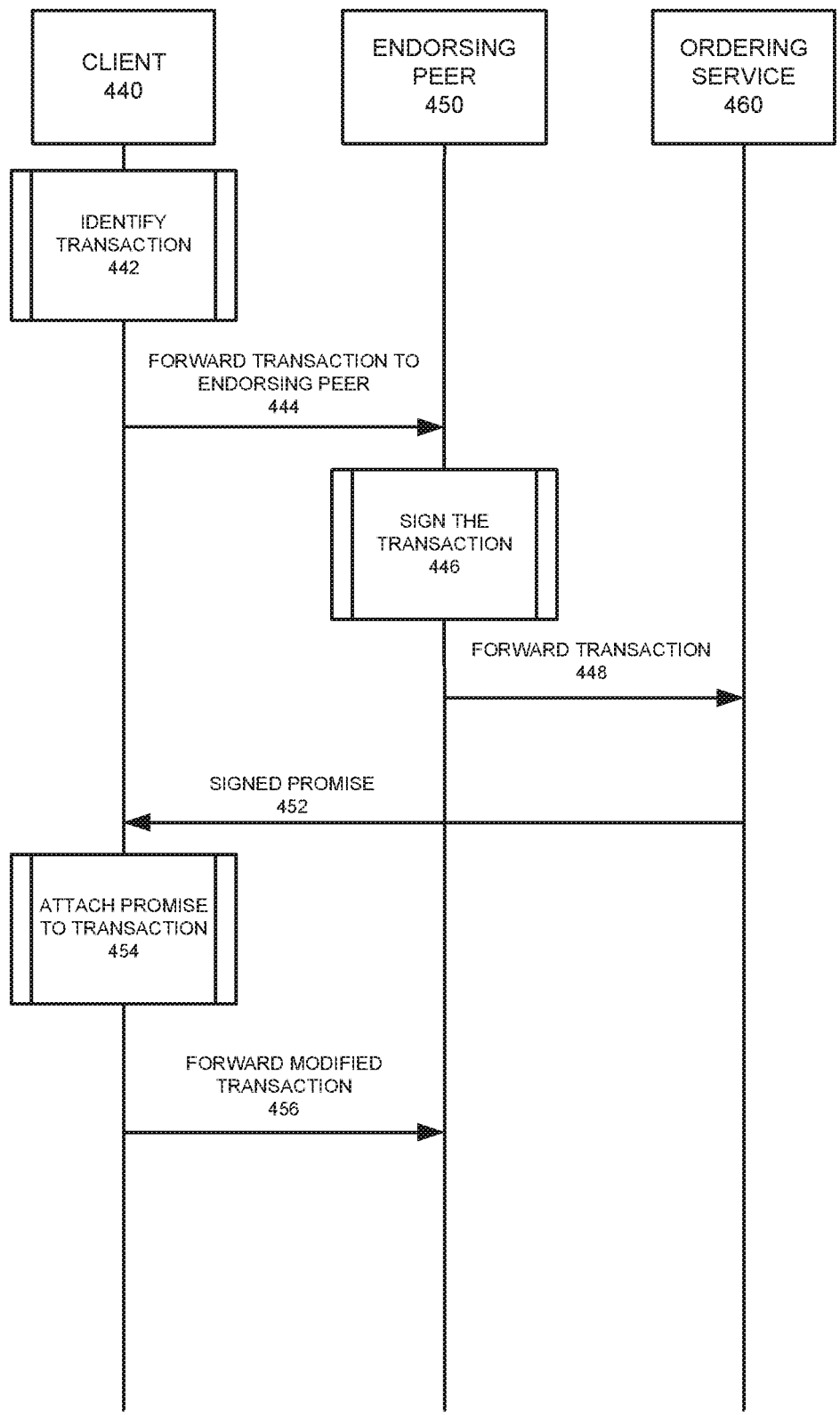
FIG. 4B illustrates a system messaging diagram for blockchain transaction management at an ordering service, according to example embodiments.

FIG. 4B illustrates a system messaging diagram for blockchain transaction management at an ordering service, according to example embodiments. In this example, the configuration 435 provides an example of a client 440, an endorsing peer(s) 450 and an ordering service 460, which may include ordering peers. The transaction requiring endorsement/commitment is identified 442 and forwarded to the endorsing peer 444, which signs the transaction 446 and forwards the transaction 448 to the ordering service 460. The transaction is then signed with a promise 452 and forwarded back to the client node. The client may then attach the promise 454 and forward the modified transaction 456 to the endorsing/committing peers.

Figure 5A:
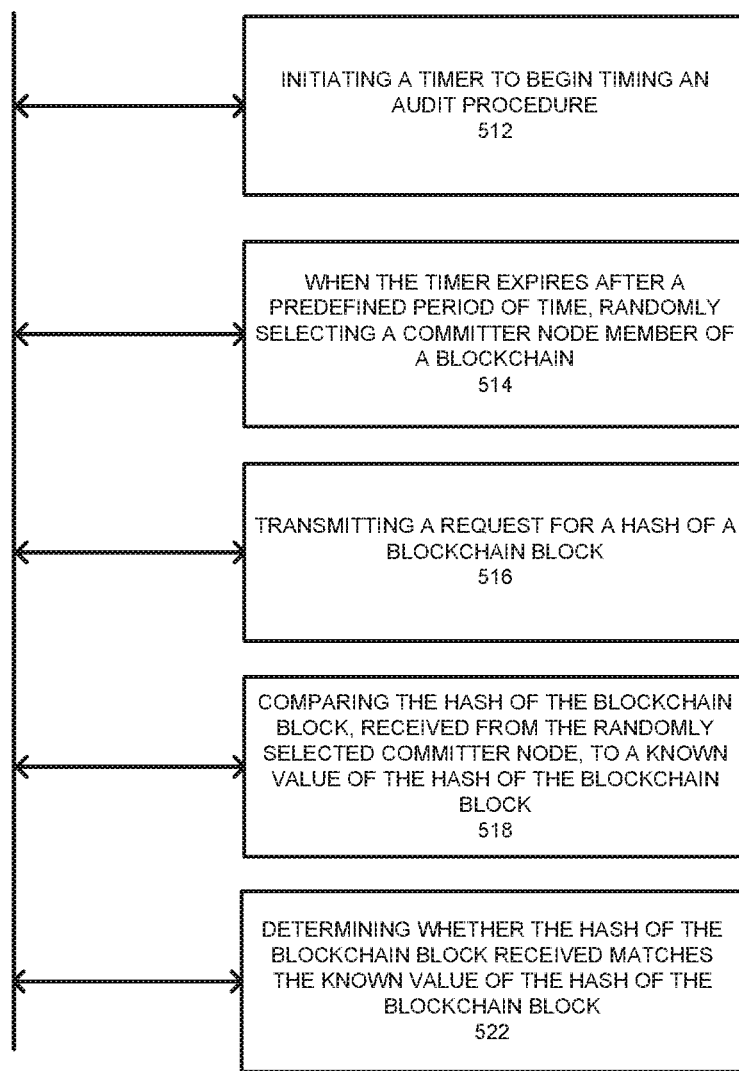
FIG. 5A illustrates a flow diagram of an example method of blockchain transaction management, according to example embodiments.

FIG. 5A illustrates a flow diagram of an example method of blockchain transaction management, according to example embodiments. Referring to FIG. 5A, the method 500 may include initiating a timer to begin timing an audit procedure 512, when the timer expires after a predefined period of time, randomly selecting a committer node member of a blockchain 514, transmitting a request for a hash of a blockchain block 516, comparing the hash of the blockchain block, received from the randomly selected committer node, to a known value of the hash of the blockchain block 518, and determining whether the hash of the blockchain block received matches the known value of the hash of the blockchain block 522.

The request is transmitted from one committer node member of the blockchain to another committer node member. The method may also include determining an ordering service used to order blockchain transactions is operating faulty when the hash of the blockchain block received does not match the known value of the hash of the blockchain block. The method may also include determining an ordering service used to order blockchain transactions is operating correctly when the hash of the blockchain block received matches the known value of the hash of the blockchain block. The method may also include transmitting an error notification to an administrator when the ordering service is determined to be operating faulty and transmitting another request to the randomly selected committer node when no response is received after a predetermined period of time and resetting the timer to a random period of time, upon expiration of which, another attempt to initiate the audit procedure is performed.

Figure 5B:
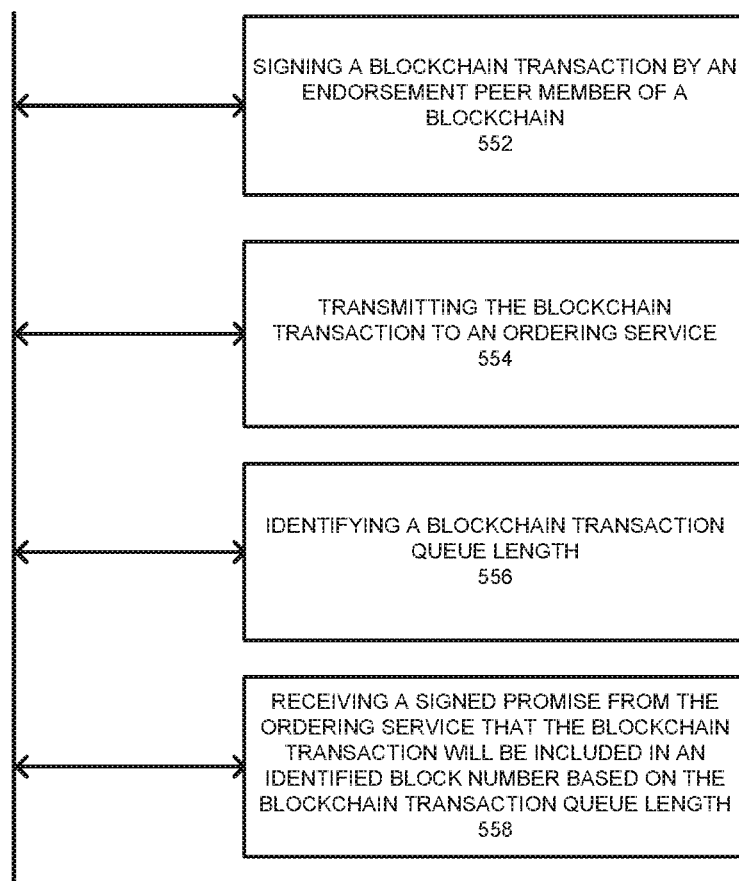
FIG. 5B illustrates a flow diagram of another example method of blockchain transaction management, according to example embodiments.

FIG. 5B illustrates a flow diagram of another example method of blockchain transaction management, according to example embodiments. Referring to FIG. 5B, the method 550 may include signing a blockchain transaction by an endorsement peer member of a blockchain 552, transmitting the blockchain transaction to an ordering service 554, identifying a blockchain transaction queue length 556, and receiving a signed promise from the ordering service that the blockchain transaction will be included in an identified block number based on the blockchain transaction queue length 558.

The method may also include creating a signed promise comprising the identified block number, transmitting the signed promise to a client node member of the blockchain, appending the signed promise to the blockchain transaction to create a modified blockchain transaction, transmitting the modified blockchain transaction to the ordering service to be committed to the blockchain, and determining, via the ordering service, whether the modified blockchain transaction comprises the signed promise. When the modified blockchain transaction includes the signed promise, the modified blockchain transaction is accepted and committed to the blockchain.

Figure 5C:
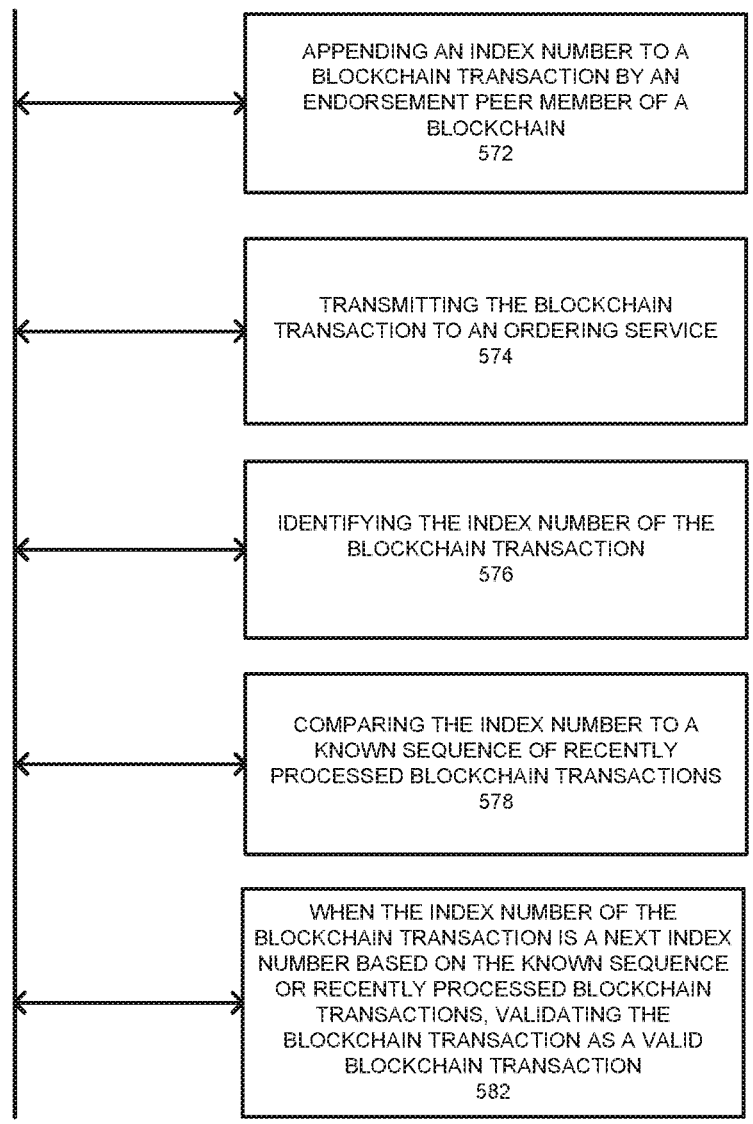
FIG. 5C illustrates a flow diagram of yet another example method of blockchain transaction management, according to example embodiments.

FIG. 5C illustrates a flow diagram of yet another example method of blockchain transaction management, according to example embodiments. In this example 570, the method may include appending an index number to a blockchain transaction by an endorsement peer member of a blockchain 572, transmitting the blockchain transaction to an ordering service 574, identifying the index number of the blockchain transaction 576, comparing the index number to a known sequence of recently processed blockchain transactions 578, and when the index number of the blockchain transaction is a next index number anticipated based on the known sequence of recently processed blockchain transactions, validating the blockchain transaction as a valid blockchain transaction 582.

In addition to the signed promise approach and hash confirmation approach to certifying pending blockchain transactions and valid operation of commitment and endorsement nodes, the transactions may be indexed and when the next transaction is identified and has an index number that is compared to the recently processed transactions, including committed transactions and soon to be committed transactions, the transaction may be quickly identified as valid or invalid. For example, the transaction index value may be contiguous with a most recent transaction, meaning next in the order of the sequence. However, if the transaction index is not related to any of the most recent transaction indexes, the result may be a failure or alert notification being created and sent to the administrator for indicating an invalid transaction was identified.

Figure 6A:
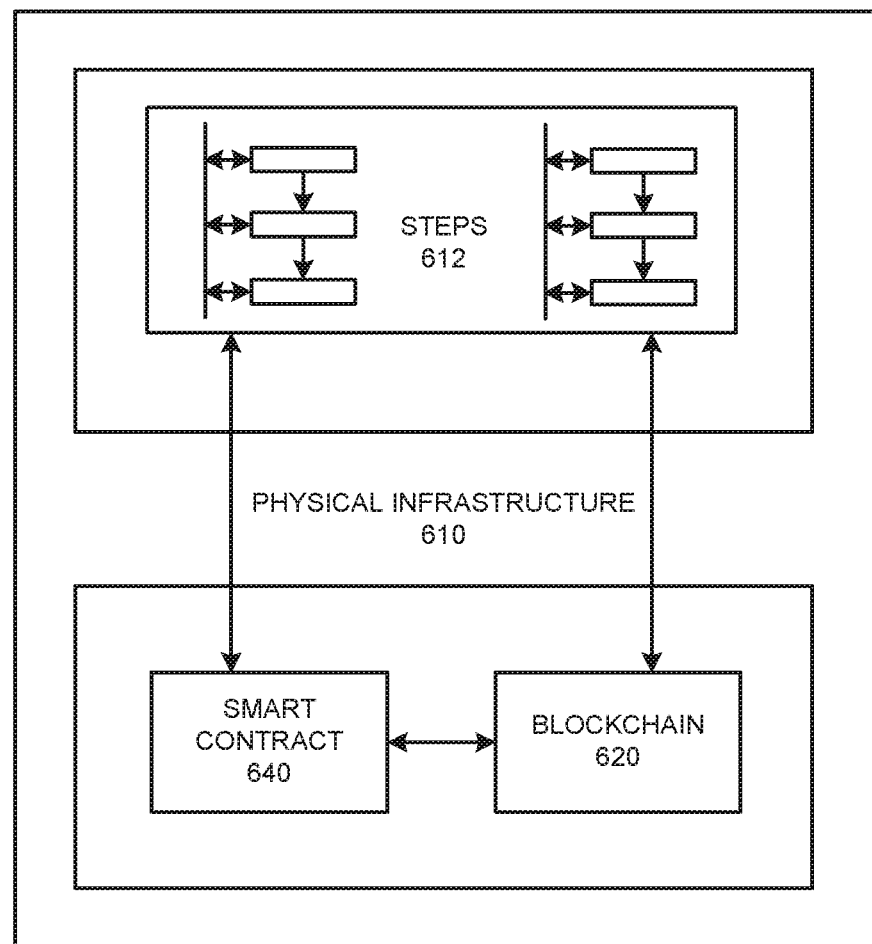
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600 includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
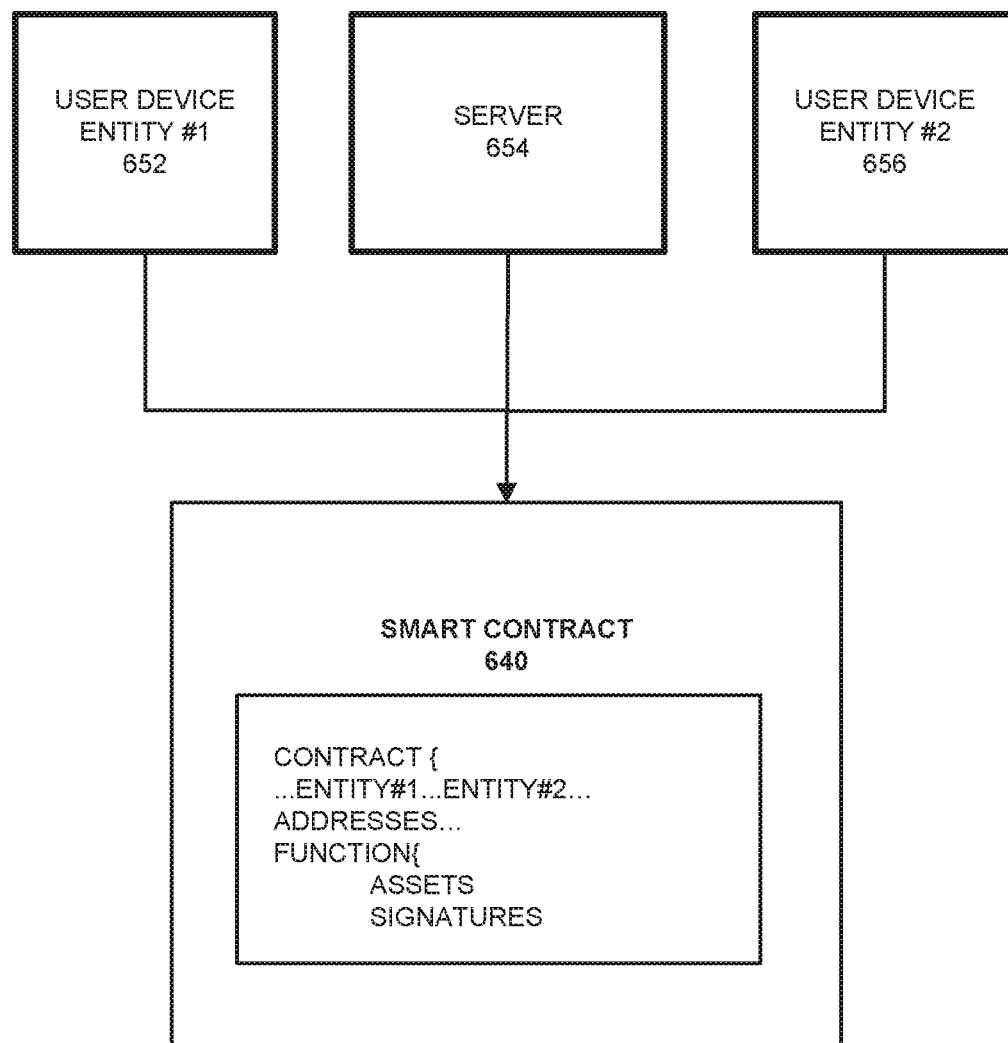
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
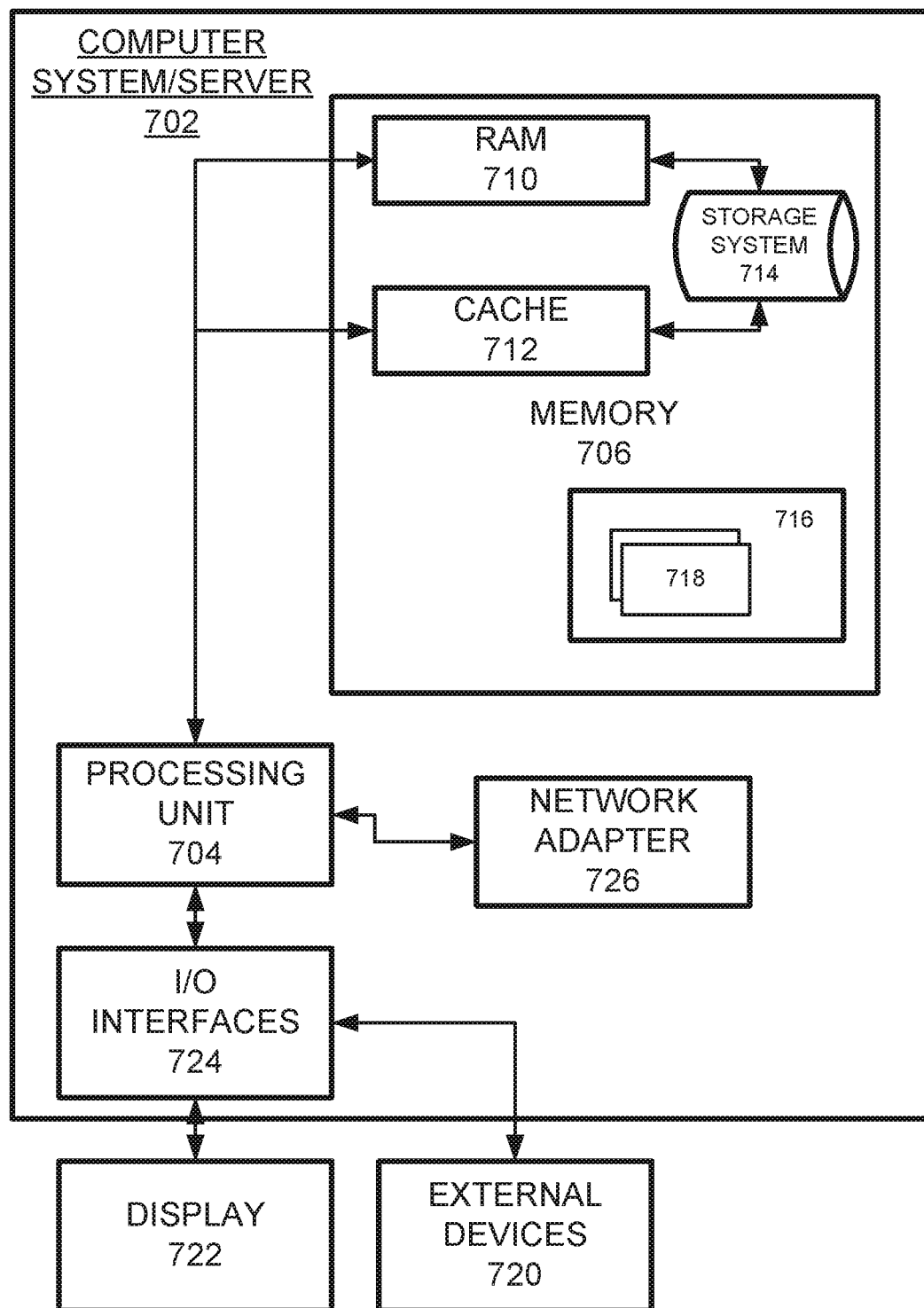
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to:

microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   endorsing, via an endorsement peer, a blockchain transaction that has been executed against a current state of a blockchain ledger by the endorsement peer;
   transmitting the endorsed blockchain transaction to an ordering service;
   receiving a signed promise from the ordering service that includes a future block number of a blockchain, wherein the future block number is generated by adding together a current block height and an offset value corresponding to a plurality of blocks; and
   appending the signed promise to the endorsed blockchain transaction;
   wherein the signed promise comprises a promise that the endorsed blockchain transaction will be included in a block having a respective block number before the future block number generated by adding together the current block height and the offset value.

2. The method of claim 1, further comprising:
   creating the signed promise comprising the future block number.

3. The method of claim 2, further comprising:
   transmitting the signed promise to a client node member of the blockchain.

4. The method of claim 1, wherein the transmitting comprises transmitting the endorsed blockchain transaction with the appended signed promise to the ordering service to be committed to the blockchain.

5. The method of claim 1, wherein the signed promise comprises a promise that the endorsed blockchain transaction will be included in a block corresponding to the future block number generated by adding together the current block height and the offset value.

6. An apparatus, comprising:
a processor configured to endorse a blockchain transaction that has been executed against a current state of a blockchain ledger by an endorsement peer;
a transmitter configured to transmit the endorsed blockchain transaction to an ordering service; and
a receiver configured to receive a signed promise from the ordering service that includes a future block number of a blockchain, the future block number being generated by adding together a current block height and an offset value corresponding to a plurality of blocks,
wherein the processor is further configured to append the signed promise to the endorsed blockchain transaction;
wherein the signed promise comprises a promise that the endorsed blockchain transaction will be included in a block having a respective block number before the future block number generated by the sum of the current block height and the offset value.

7. The apparatus of claim 6, wherein the processor is further configured to create the signed promise comprising the future block number.

8. The apparatus of claim 7, wherein the transmitter is further configured to transmit the signed promise to a client node member of the blockchain.

9. The apparatus of claim 6, wherein the transmitter is further configured to transmit the endorsed blockchain transaction with the appended signed promise to the ordering service to be committed to the blockchain.

10. The apparatus of claim 6, wherein the signed promise comprises a promise that the endorsed transaction will be included in a block corresponding to the future block number generated by adding together the current block height and the offset value.

11. A non-transitory computer readable storage medium configured to store instructions that when executed cause a processor to perform:
endorsing a blockchain transaction that has been executed against a current state of a blockchain ledger by an endorsement peer;
transmitting the endorsed blockchain transaction to an ordering service; and
receiving a signed promise from the ordering service that includes a future block number of a blockchain, wherein the future block number is generated by adding together a current block height and an offset value corresponding to a plurality of blocks; and
appending the signed promise to the endorsed blockchain transaction;
wherein the signed promise comprises a promise that the endorsed blockchain transaction will be included in a block having a respective block number before the future block number generated by adding together the current block height and the offset value.

12. The non-transitory computer readable storage medium of claim 11, wherein the processor is further configured to perform:
creating the signed promise comprising the future block number.

13. The non-transitory computer readable storage medium of claim 12, wherein the processor is further configured to perform:
transmitting the signed promise to a client node member of the blockchain.

14. The non-transitory computer readable storage medium of claim 13, wherein the signed promise comprises a promise that the endorsed blockchain transaction will be included in a block having a respective block number before the future block number generated by adding together the current block height and the offset value.

15. The non-transitory computer readable storage medium of claim 14, wherein the processor is further configured to perform:
transmitting the endorsed blockchain transaction with the appended signed promise to the ordering service to be committed to the blockchain.

\* \* \* \* \*